Sept. 8, 1970     L. O. HEWKO     3,527,513

SELF-PRELOADING BEARING FOR HIGH SPEED APPLICATION

Filed Dec. 16, 1968

INVENTOR.
Lubomyr O. Hewko

BY
F. J. Fadale
ATTORNEY

United States Patent Office 3,527,513
Patented Sept. 8, 1970

3,527,513
SELF-PRELOADING BEARING FOR HIGH
SPEED APPLICATION
Lubomyr O. Hewko, Port Clinton, Ohio, assignor to
General Motors Corporation, Detroit, Mich., a corporation of Delaware
Filed Dec. 16, 1968, Ser. No. 784,110
Int. Cl. F16c 19/00
U.S. Cl. 308—215                      3 Claims

ABSTRACT OF THE DISCLOSURE

A roller bearing in which the rollers have hollow ends and a reverse crown. The maximum diameter at the roller ends is sufficiently larger than the annular space between the races so that there is always a driving force transmitted to the cage from the inner race through at least one roller.

My invention relates generally to roller bearings and more specifically to roller bearings for high speed, light load applications such as is found in gas turbine engines.

One of the constantly recurring problems in such a situation is premature bearing wear caused by skidding of the bearing rollers. In cage-guided roller bearings, the skidding of the rollers is thought to be attributable to periodic deceleration of the roller cage which in turn is caused by temporary lapse of a driving force to the cage from the rollers. Among the remedies applied in the past is that of preloading conventional type rollers in a roller bearing to accommodate the radial growth between the races. However, this technique is not without limitation since preload degenerates with speed and temperature increase. In the high speed, hot environment of the operating gas turbine engine, an amount of preload to drive the cage would be the residue of an initial preload which the bearing could not tolerate and still have a reasonable bearing life.

My invention has as its object to provide a roller bearing with special rollers which may be preloaded to an extent sufficient to provide a driving force to the roller cage under the most adverse conditions and yet retain a reasonable bearing life.

This I have generally accomplished by hollowing the end portions of the rollers and providing a reverse crown on the rolling surface. This design provides adequate load capacity through the solid portion of the rollers and at the same time provides resilient larger diameter ends which can accept a higher initial deflection at a lower preload and thereby tolerate a larger relative radial growth between the races while still maintaining a driving force to the cage. The low preload-high deflection characteristic in turn enhances bearing life.

The exact nature of this invention as well as other objects and advantages thereof will be readily apparent from consideration of the following specification relating to the annexed drawing in which.

Figure 1:
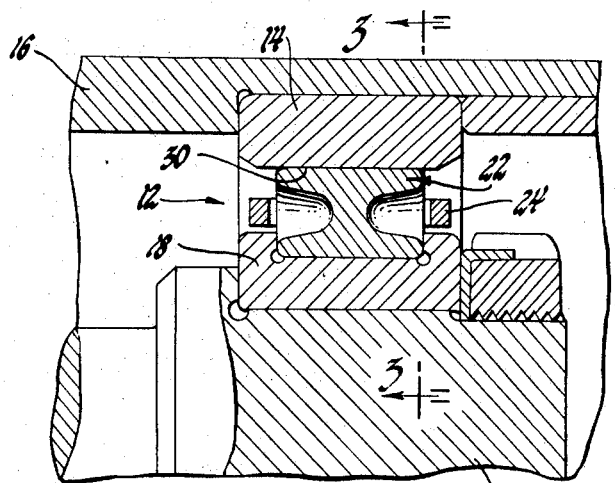
FIG. 1 is an axial section showing a typical installation of a bearing in accordance with my invention wherein the bearing is preloaded and not operating such as when a gas turbine engine is shut down.

Referring now to the drawing, FIG. 1 shows a typical installation for a bearing indicated generally at 12 in accordance with my invention. As mentioned previously, the bearing 12 is specifically designed for use in a light load, high speed, high temperature application such as is found in a gas turbine engine although the principle of my invention is equally applicable to other situations where a combination of environmental factors causes problems associated with roller skidding.

As is typical in a gas turbine installation, the bearing outer race 14 is fixedly mounted in a supporting structure 16 while the inner race 18 is secured to a rotating shaft 20 and accordingly is considered a driving race. A set of rollers 22 separated by a cage 24 completes the bearing 12. The particular bearing illustrated uses a double shouldered inner race 18 which axially locates the complement of rollers 22 and a plain or unshouldered outer race 14 which permits axial adjustment of the shaft 20 with respect to the supporting structure 16. However, these particular attributes are not essential to my invention since a shaft which is supported at a number of points usually is axially fixed with respect to the housing at only one bearing point with the remaining bearings having this axial float feature.

Figure 2:
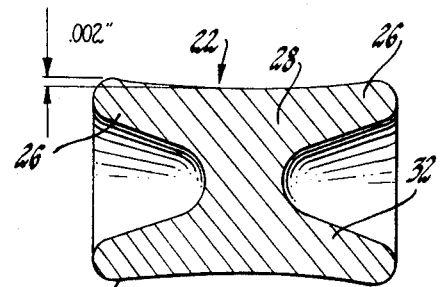
FIG. 2 is a section view of a roller in FIG. 1 showing the roller in its free state before it is placed between the races.

A typical bearing roller 22 of my invention is shown in FIG. 2 in its free state, that is, in its condition after complete manufacture and before assembly between the races 14 and 18. The roller has hollow ends 26 and a solid center 28. The rolling contact surface 30 of the roller has a reverse crown which appears dish-shaped in cross section. The amount of reverse crown as well as the ratio of the length of the solid center 28 to the length of the hollow ends 26 varies depending on the material of the roller and the operating environment of the bearing. However, by way of example, and not of limitation, the order of magnitude of these values, the reverse crown is shown as 0.002 inch for a roller of approximately ¼ inch to ½ inch in diameter. The reverse crown on the rolling contact surface blends into a corner radius which is selected to limit stress concentrations at the roller ends. The hollow ends 26 each are about a third of the bearing length with the solid portion 28 being the remaining third. As mentioned above, these values are only indicative of magnitude as many factors contribute to the design of a particular bearing in accordance with my invention. For instance, the resiliency of the bearing ends are effected not only by the length of the hollow end 26 but also its internal contour 32.

Figure 3:
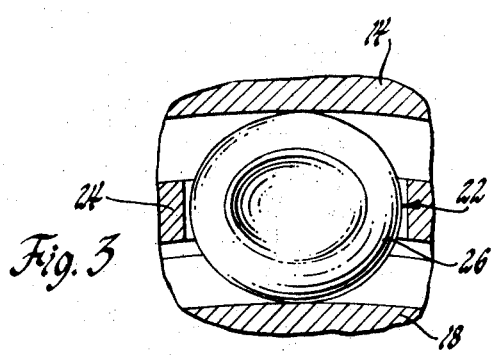
FIG. 3 is a section taken along the line 3—3 of FIG. 1 showing the ovalized condition of the roller ends which occurs when the roller is placed between the races.

When the roller 22 is assembled between the races 14 and 18, the roller surface 30 is flattened where it contacts the races as shown in FIG. 1 and the hollow ends 26 assume an oval-shape as shown in FIG. 3.

Figure 4:
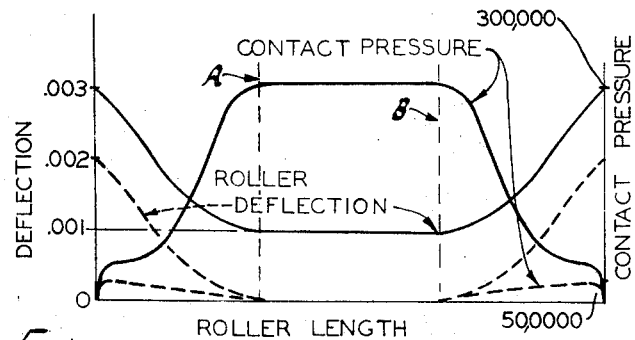
FIG. 4 is a graph showing the initial contact pressure and roller deflection along the length of a roller at its line of contact with the inner races with the roller in the condition shown in FIGS. 1 and 3.

This flattening of the rolling surface and deflection of the hollow ends 26 produces a contact pressure on the inner race adjacent the roller ends as shown by the broken lines in FIG. 4.

In FIG. 4, the entire roller 22 is shown as preloaded by an aditional deflection of .001 inch along the entire length of the roller. This additional deflection greatly increases the contact pressure of the solid roller center pressure of the resilient hollow ends as shown in the solid pressure of the resilient hollow ends as shown in the sold lines. Thus in those instances where the growth of the annular space between the races is extremely high, an additional compensation can be made by preloading the entire roller an additional amount by an interference fit on the order of .001 to .002 inch which is well within the capacity of present roller bearings without materially effecting bearing life. Also the aditional deflection, since it produces only a small additional amount of internal stress on the hollow roller ends, can be handled easily. The condition at the line of contact between the roller and the outer race would be substantially identical.

Figure 5:
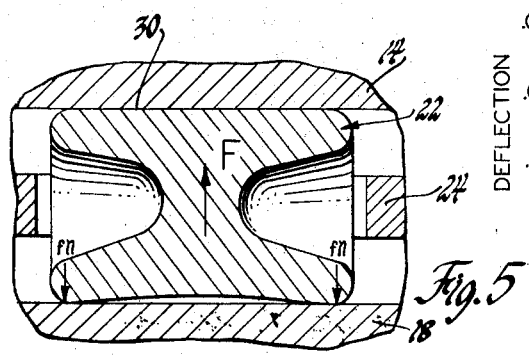
FIG. 5 is a fragmentary view similar to FIG. 1 showing the relationship between the races and a typical roller with the bearing subjected to its most adverse environment.

FIG. 5 illustrates the condition of the roller 22 in its most adverse environment such as occurs in a gas turbine engine at maximum speed, temperature and in a flight condition which produces weightlessness. In such a condition, the inner race 18 is substantially concentric with the outer race 14 since there is no force produced by the weight of the shaft 20. The concentricity and weightlessness provides an extreme condition because the weight of the shaft does normally provide a beneficial effect, that is, it produces a slight eccentricity of the races so that at least one roller is disposed between the races in a space slightly diminished by the eccentricity.

Figure 6:
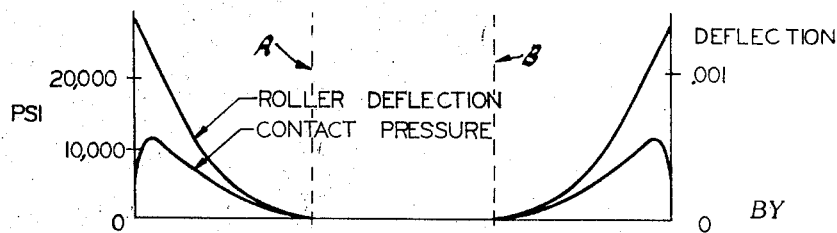
FIG. 6 is a graph showing the contact pressure and roller deflection along the length of the roller at its line of contact with the inner race with the roller related to the races as shown in FIG. 5.

In FIG. 5, the maximum temperature has produced the maximum growth of the annular space between the races and the maximum speed has produced a maximum centrifugal force F on the orbiting roller 22. This force F tends to throw the roller 22 out aginst the outer race 14 which as previously mentioned is stationary. Under high speed conditions, it is possible that the centrifugal force is sufficient to flatten the rolling contact surface 30 against the outer raceway. The centrifugal force also tends to lift the roller 22 from the inner race 18 which as previously mentioned is the driving race and which is the only source of power for driving the cage 24. However, as roller is thrown radially outwardly, the resilient hollow ends of the rollers expand and remain in contact with the inner race 18. Until the hollow ends completely expand to a free state, this deflection produces a force $f_n$ normal to the raceway of the inner race 18. The normal force $f_n$ in turn creates a frictional force or driving force which enables the inner race to transmit torque to the cage 24 through the rollers to drive the cage 24 thereby preventing or at least reducing roller skidding. FIG. 6 shows the condition existing at the area of contact between the roller 22 and the inner race 18. The solid center portions of the roller 22 having been lifted slightly off the inner raceway experiences no deflection and no contact pressure. The resilient ends, however, are still deflected to some degree and th resulting contact pressure produces a cage driving force. It is important to design the bearing and more particularly the rollers so that the hollow ends are always deflected to some extent even under the most adverse conditions.

FIGS. 5 and 6 illustrate the extreme condition. As the bearing moves away from the extreme condition, the deflection of the resilient ends and their contact pressure is increased and eventually the entire roller is deflected slightly. Note the resilient ends accommodate a much larger growth between the race with a lower initial preload and the solid center portion of the bearing retains a reasonable load capacity for the bearing.

As mentioned at the outset, the dimensioning of a particular bearing depends on the bearing material itself and its environmental conditions. A useful approach in designing a bearing in accordance with my invention is to first determine the maximum growth between the race due to temperature and speed. In addition, the centrifugal force acting on the roller and a weightlessness condition if such a condition could exist must be taken into account. The necessary cage driving force required by the particular cage is then determined and this transformed into the necessary normal force $f_n$ for the roller 22. Once this normal force $f_n$ is determined, a combination of the resilience of the hollow rollers and the dishing of the roller contact surface can be chosen so that there is no excessive preload when the bearing is at rest and not operating. In addition, the hollow ends and reverse crown can be combined with an additional preload on the entire roller to effect the desired results.

I claim:

1. In a roller bearing having a first race and a driving race rotating relative thereto with a complement of rollers therebetween separated by a cage for high speed and temperature and low load operation, the improvement comprising rollers having hollow resilient ends and a reverse crown on their rolling contact surface, said roller ends being sufficiently resilient to transmit a driving force to said cage from said driving race at said high speed and temperature and low load operation where the radial spacing between the races is at a maximum and said crown being sufficient to prevent an excessive preload when the radial spacing between said races is at a minimum.

2. A roller bearing subject to high speed, high temperature, and weightless operation comprising a stationary outer race, a driving inner race, a complement of rollers between said races, and a cage separating said rollers, said rollers having resilient hollow ends and a reverse crown on their rolling contact surface having maximum diameters adjacent the roller ends and a minimum diameter at their solid centers, said maximum diameter being at least greater than the minimum diameter of the rollers by an amount sufficiently greater than the amount of radial growth between said races at said high speed, high temperature and weightlessness to transmit a driving force from said inner race to said cage.

3. The bearing as defined in claim 2 wherein said minimum diameter is so related to said races that the maximum preload which occurs is under ambient and nonoperating conditions.

References Cited

FOREIGN PATENTS 553,811   3/1958   Great Britain.

MARTIN P. SCHWADRON, Primary Examiner

F. SUSKO, Assistant Examiner

PO-1050
(5/69)

UNITED STATES PATENT OFFICE
CERTIFICATE OF CORRECTION

Patent No. 3,527,513      Dated September 8, 1970

Inventor(s) Lubomyr O. Hewko

It is certified that error appears in the above-identified patent and that said Letters Patent are hereby corrected as shown below:

Column 2, lines 70 and 71 reading "pressure of the resilient hollow ends as shown in the solid" and "pressure of the resilient hollow ends as shown in the sold", respectively, should read --between A and B but does not greatly increase the contact pressure of the resilient hollow ends as shown in the solid--.

Column 3, line 35, insert --the-- before "roller".

Column 3, line 50, delete "th" and insert therefor --the--.

SIGNED AND
SEALED
DEC 8 -1970

(SEAL)
Attest:

Edward M. Fletcher, Jr.
Attesting Officer

WILLIAM E. SCHUYLER, JR.
Commissioner of Patents